Figure 3:
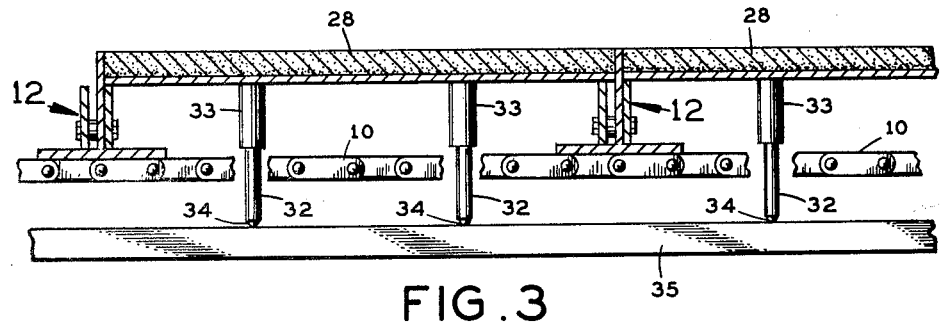

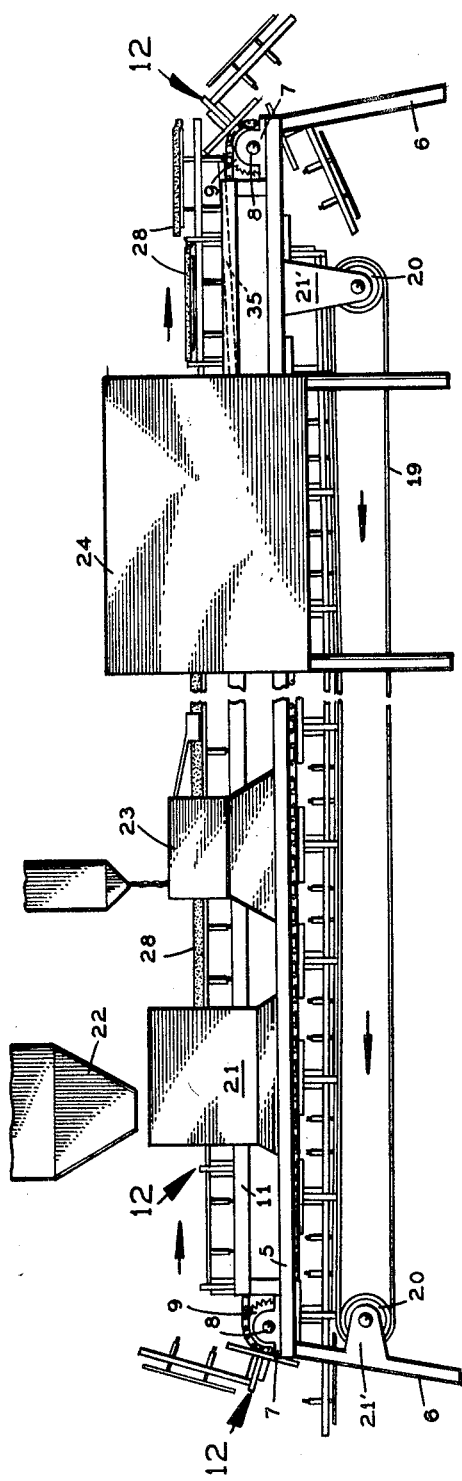
April 6, 1965     G. W. LANG     3,176,372
MACHINE FOR MOLDING MASTIC ARTICLES
Filed April 1, 1963     15 Sheets-Sheet 1
INVENTOR.
GUS W. LANG
BY
ATTORNEY April 6, 1965    G. W. LANG    3,176,372
MACHINE FOR MOLDING MASTIC ARTICLES
Filed April 1, 1963    15 Sheets-Sheet 2

INVENTOR.
GUS W. LANG
BY
AT TORNEY

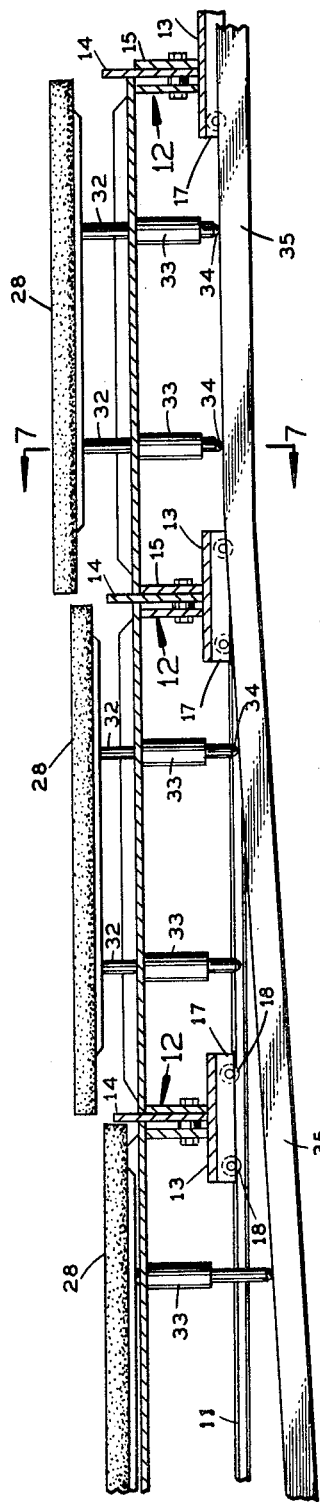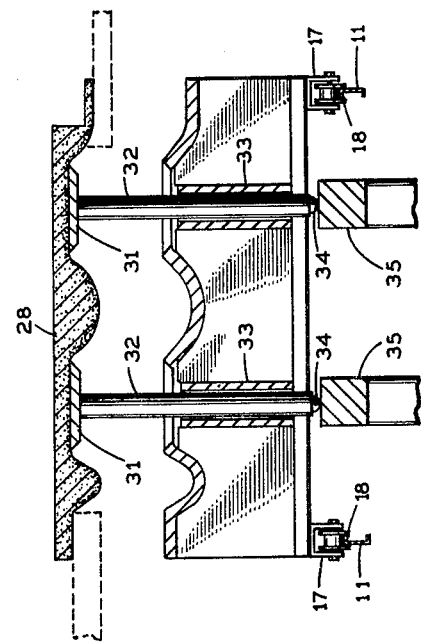

April 6, 1965   G. W. LANG   3,176,372
MACHINE FOR MOLDING MASTIC ARTICLES
Filed April 1, 1963   15 Sheets-Sheet 6

INVENTOR.
GUS W. LANG
BY
*James W. [signature]*
ATTORNEY

INVENTOR.
GUS W. LANG

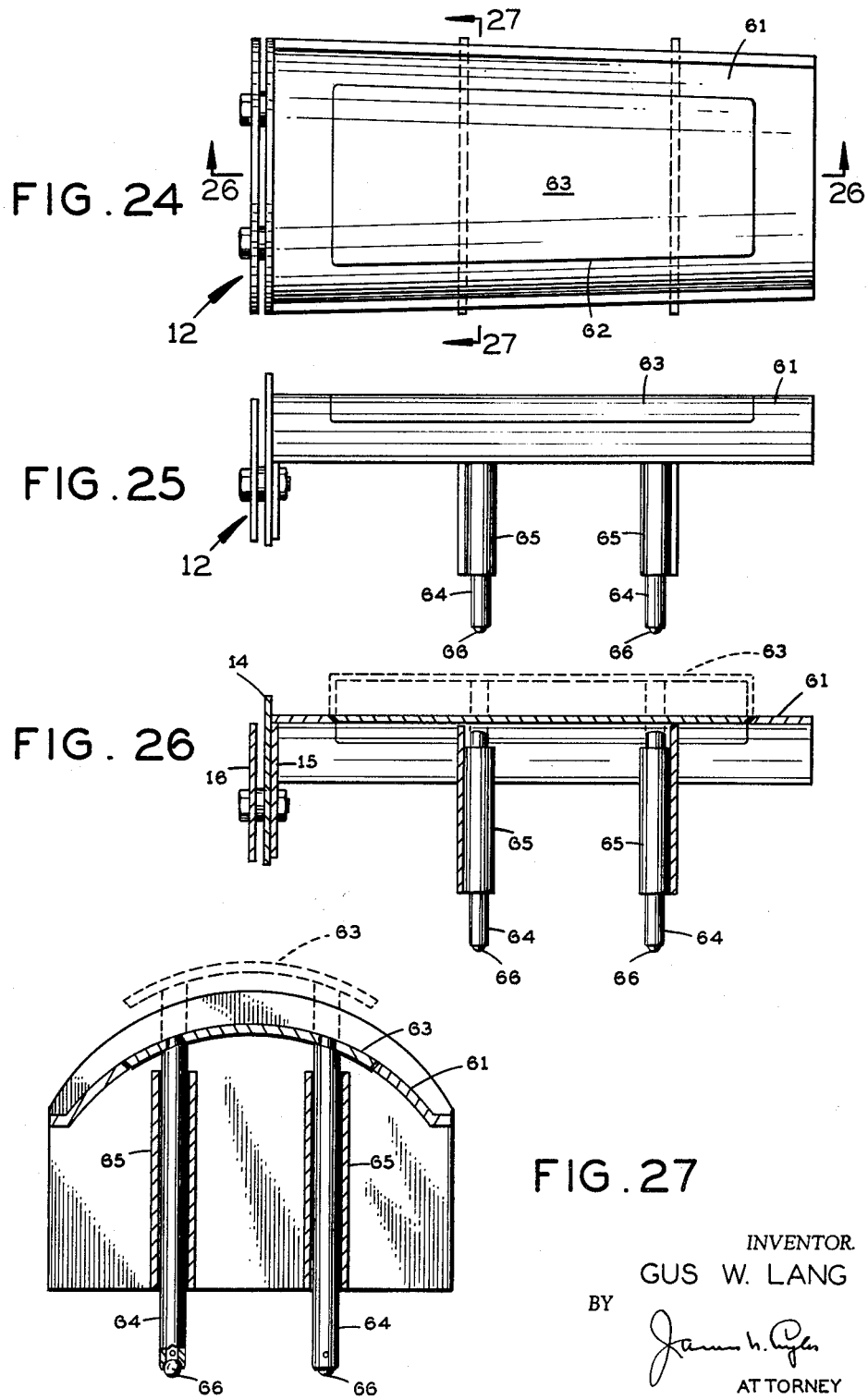

INVENTOR.
GUS W. LANG
BY
ATTORNEY

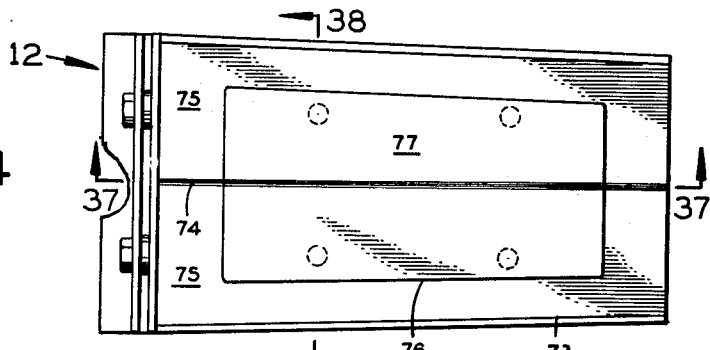
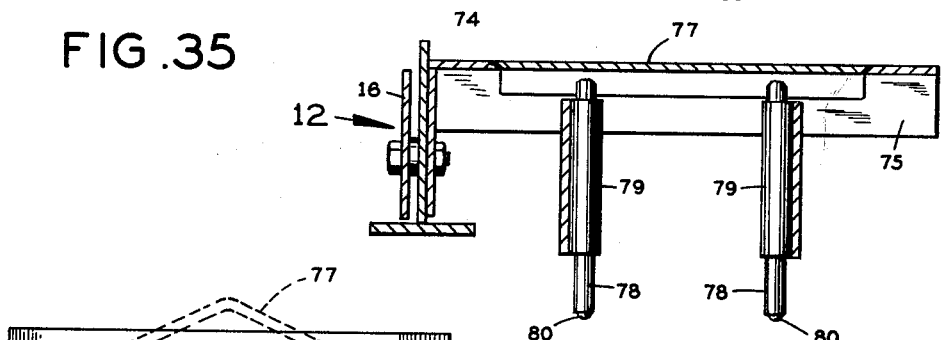
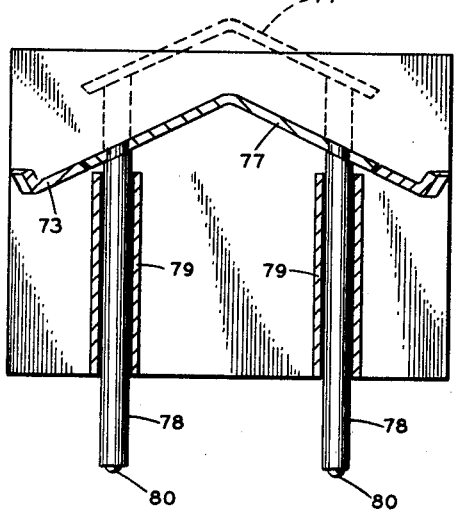

April 6, 1965 G. W. LANG 3,176,372
MACHINE FOR MOLDING MASTIC ARTICLES
Filed April 1, 1963 15 Sheets-Sheet 11

INVENTOR.
GUS W. LANG
BY
ATTORNEY

April 6, 1965  G. W. LANG  3,176,372
MACHINE FOR MOLDING MASTIC ARTICLES
Filed April 1, 1963  15 Sheets-Sheet 12

INVENTOR.
GUS W. LANG
BY
ATTORNEY

April 6, 1965   G. W. LANG   3,176,372
MACHINE FOR MOLDING MASTIC ARTICLES
Filed April 1, 1963   15 Sheets-Sheet 13

INVENTOR.
GUS W. LANG
BY
AT TORNEY

INVENTOR.
GUS W. LANG
BY
*James H. Ogden*
ATTORNEY

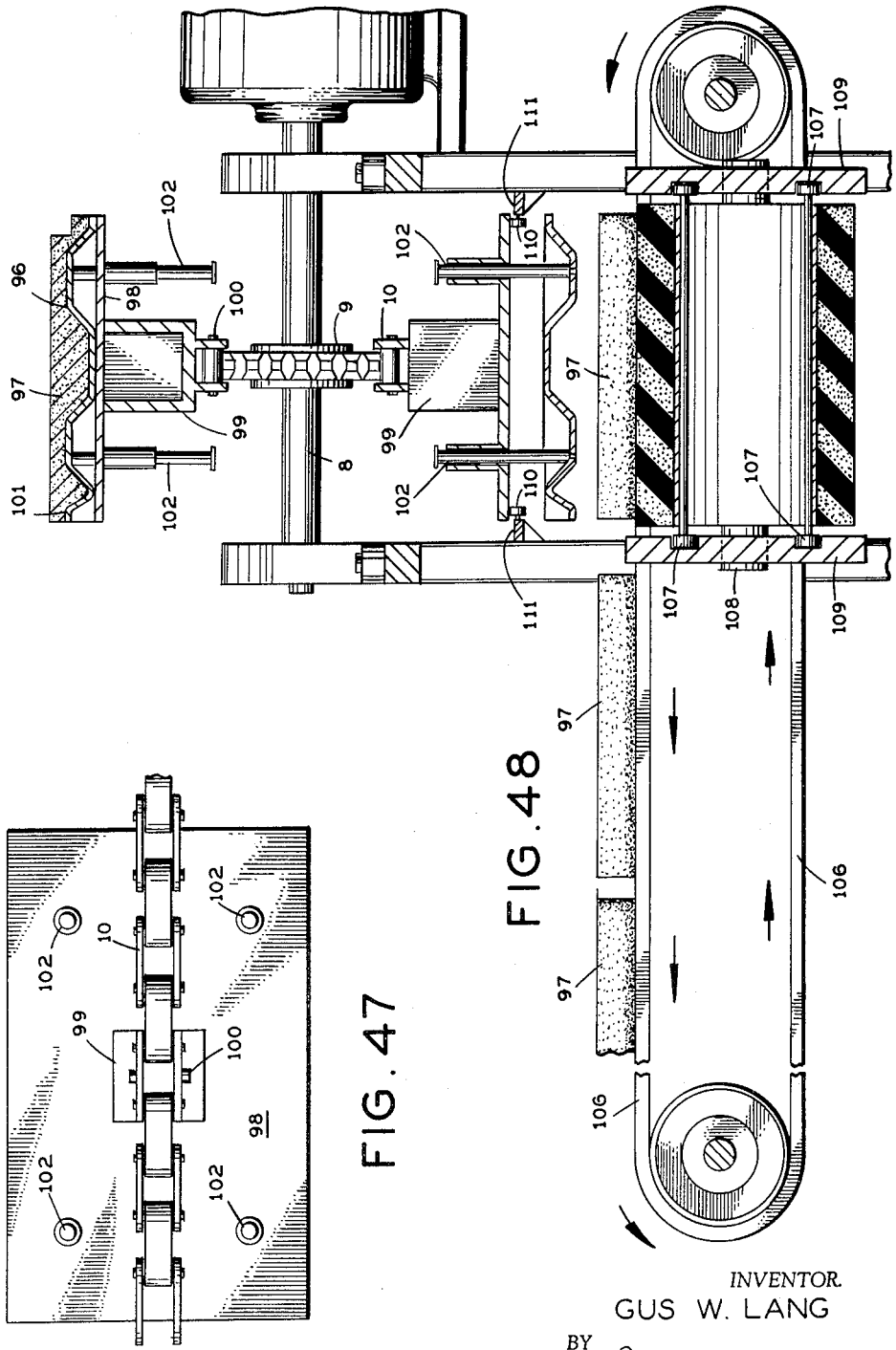

United States Patent Office 3,176,372
Patented Apr. 6, 1965

3,176,372
MACHINE FOR MOLDING MASTIC ARTICLES
Gus W. Lang, Hollywood, Fla., assignor to Thomas O. Brown, Jr., Hollywood, Fla.
Filed Apr. 1, 1963, Ser. No. 269,678
6 Claims. (Cl. 25—99)

This invention relates to a machine for the continuous molding and discharge of mastic articles, such as cement or clay tile, cement or clay bricks, cement or clay building bricks and various other articles that may be formed or molded of cement or clay.

The invention contemplates a molding machine having an endless chain that carries a plurality of spaced apart pallet heads that are substantially fixed with respect to the conveyor and that traverses the machine first, through a hopper where the pallets are progressively filled with the mastic material to then pass through a heated oven device where the mastic material is initially cured and with means associated with each of the pallets whereby the articles being formed are progressively elevated for removal from the discharge end of the machine.

Molding machines heretofore have embodied an endless conveyor having pallet supporting heads but in such cases, the pallet is freely removable from the pallet heads at the discharge end of the machine so that the pallets and their supported molded articles may be stacked in a suitable rack for subsequent curing, such requiring a very considerable expense in the manufacture of pallets since the pallet being removed at the discharge end of the machine can not be used again until the molded article has completely hardened and other pallets are progressively installed upon the pallet heads at the entrance end of the machine by one or more operators while one or more operators are disposed at the discharge end of the machine, greatly increasing the labor costs during the operation of the device. In the present machine which may be of any desirable length, the pallets are connected either to the heads or intermediate the heads so that they continuously travel in a continuous path through the hopper, the oven and to the discharge end where the molded article is elevated and removed by an attendant and the pallets then continue to travel in a reverse direction to the initial starting point, requiring only the number of pallets in accordance with the pallet supporting heads for the continuous operation of the device.

A further object of the invention resides in novel forms of pallets upon which the articles are molded and with the pallets being provided with vertically movable segments that are normally flush with the face of the pallet and with the segments being provided with elevating rods that progressively engage an inclined track after the pallets and the molded products have passed through the oven to progressively elevate the molded article so that it can be manually removed at the discharge end of the machine for loading or stacking or a suitable conveyor may be arranged at the discharge end of the machine upon which the attendant places the initially cured articles to be shifted laterally in either direction. In certain types of articles, such as roofing tile, it may be necessary to coat or slick the surface of the tile and for that purpose, a suitable slicker may be employed to overlie the tiles as they are shifted away from the hopper and prior to the entrance of the tile into the baking oven.

A further object of the invention resides in a continuously operating machine for forming roofing tile of various types in conformity with the particular pallet being employed and with one end of the pallet being fixedly connected to one side of a pallet head, while its opposite end is in resting engagement upon a support of the next leading pallet head so that the pallets are all fixed with respect to the machine.

A further object of the invention is to provide a machine for the continuous molding of mastic tile or other products and with the machine at its discharge end embodying a curved apron whereby the products are automatically unloaded from the pallets as the pallets follow the conveyor chain and with the apron conforming to the arcuate path of the pallet so that the molded product is automatically unloaded onto the apron to be conducted rearwardly of the machine for automatic discharge upon a lateral conveyor and with the apron being positively guided in its arcuate path by a suitable guide trackways and with the apron being provided with a cushion facing to prevent damage to the tile as it falls thereon.

A further object of the invention resides in an endless conveyor having a plurality of pallet heads forming separators between adjacent molded products and with the pallets intermediate their length being connected to the chain conveyor and with the pallets also being provided with push rods and segments that engage a lower trackways that push the products from the pallets onto the cushioned conveyor.

A further object of the invention resides in supporting means for the return flight of the pallets and the pallet heads after the molded product has been discharged onto the cushion apron.

Novel features of construction and operation of the device will be more clearly apparent during the course of the following description, reference being had to the accompanying drawings wherein has been illustrated the preferred forms of the device and wherein like characters of reference are employed to denote like parts throughout the several figures.

Figure 4:
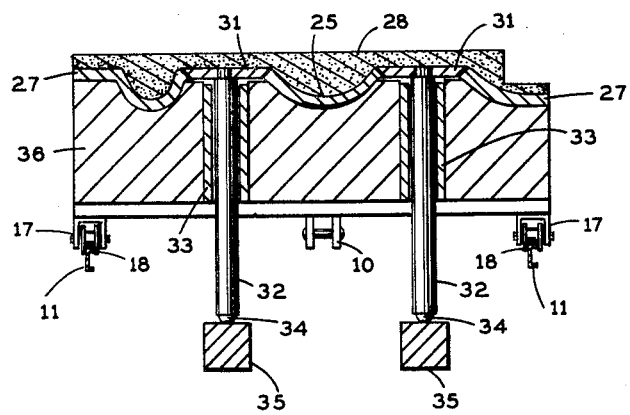
Figure 5:
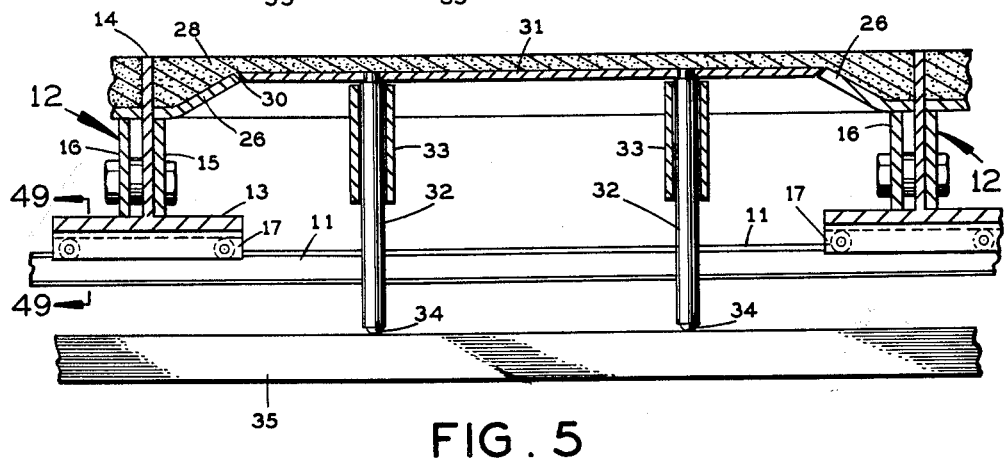
Figure 49:
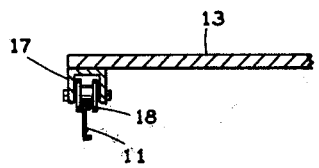
Figure 8:
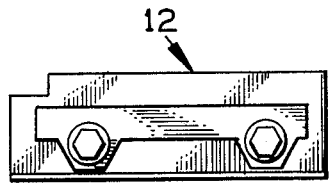
Figure 9:
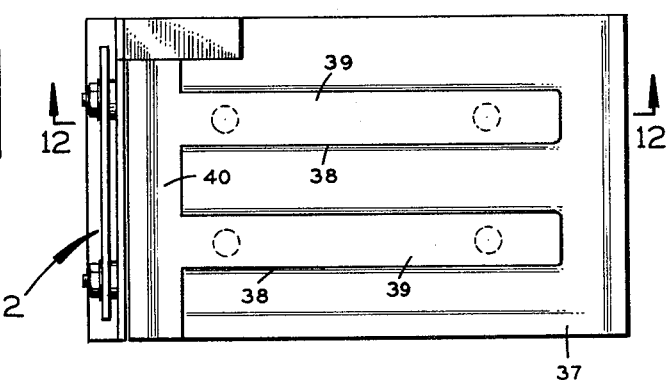
Figure 10:
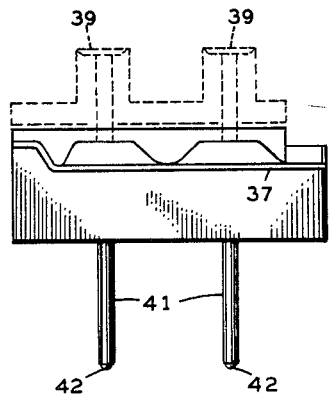
Figure 11:
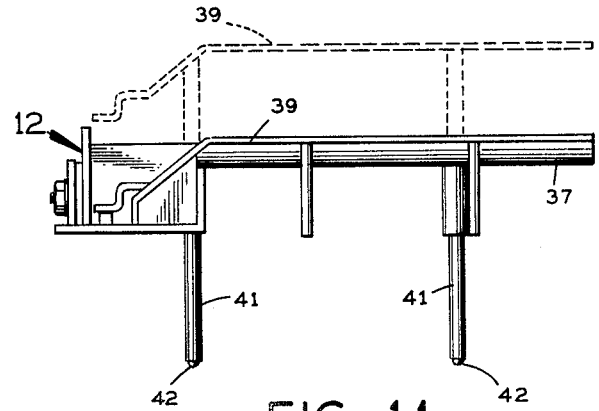
Figure 12:
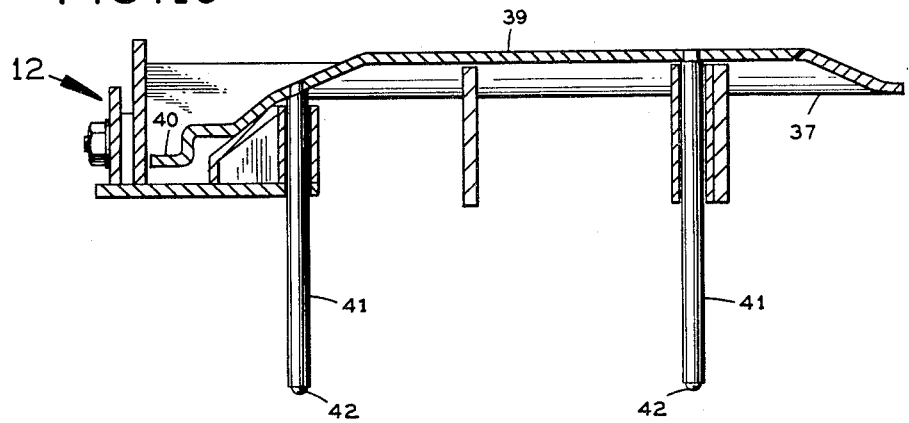
Figure 13:
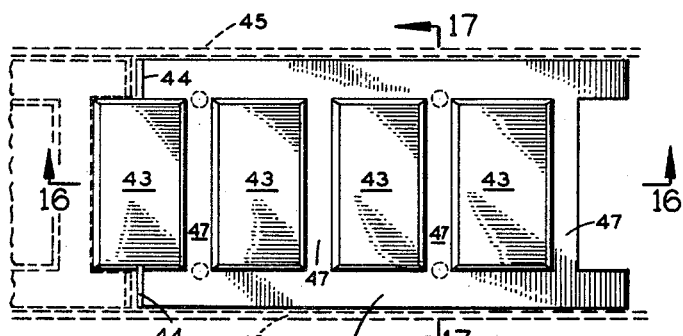
Figure 14:
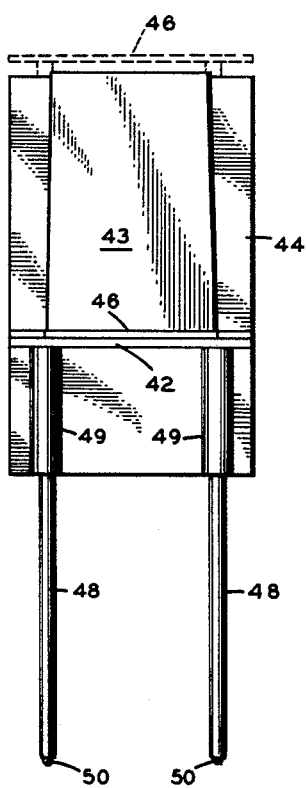
Figure 15:
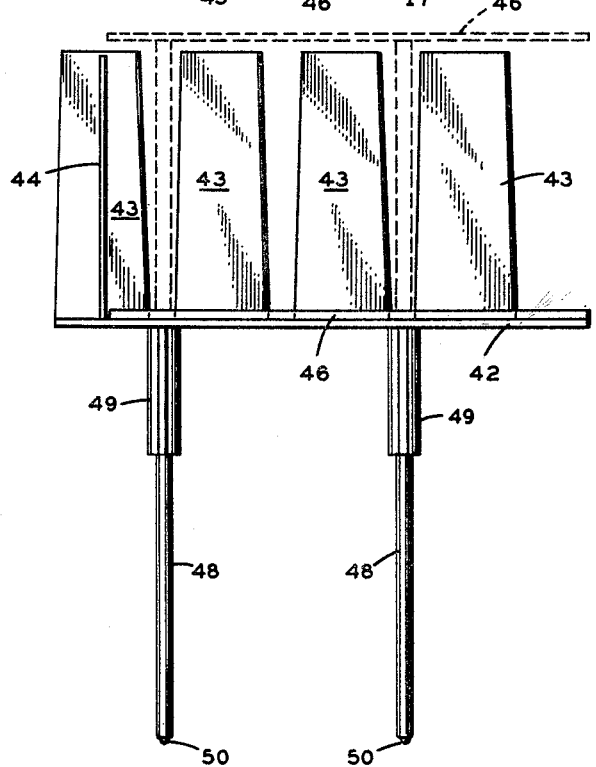
Figure 16:
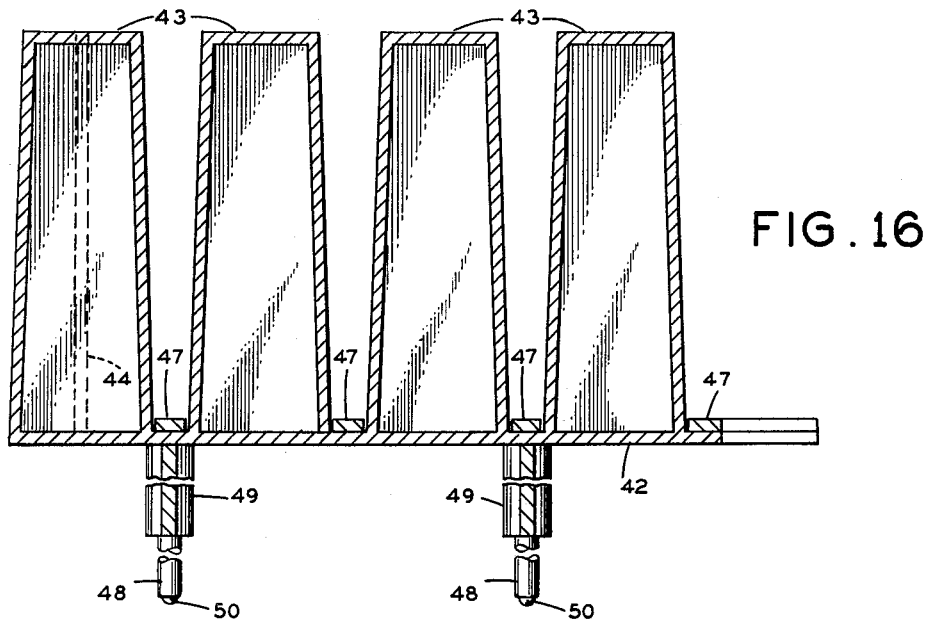
Figure 17:
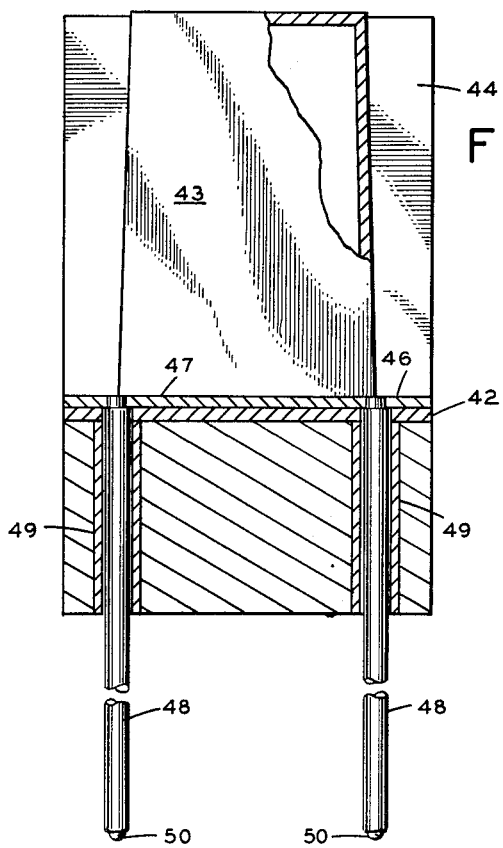
Figure 18:
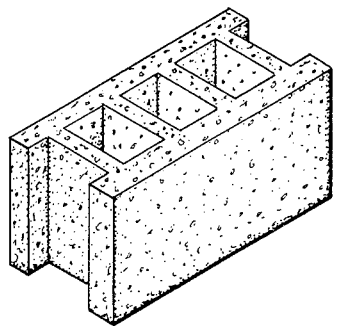
Figure 19:
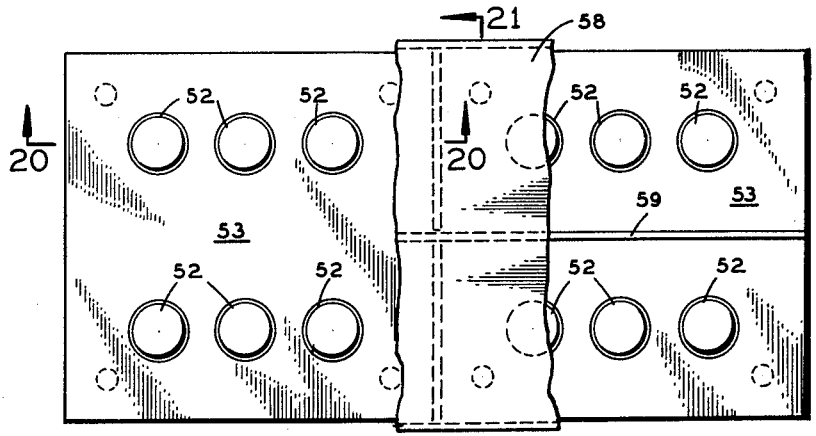
Figures 20, 21:
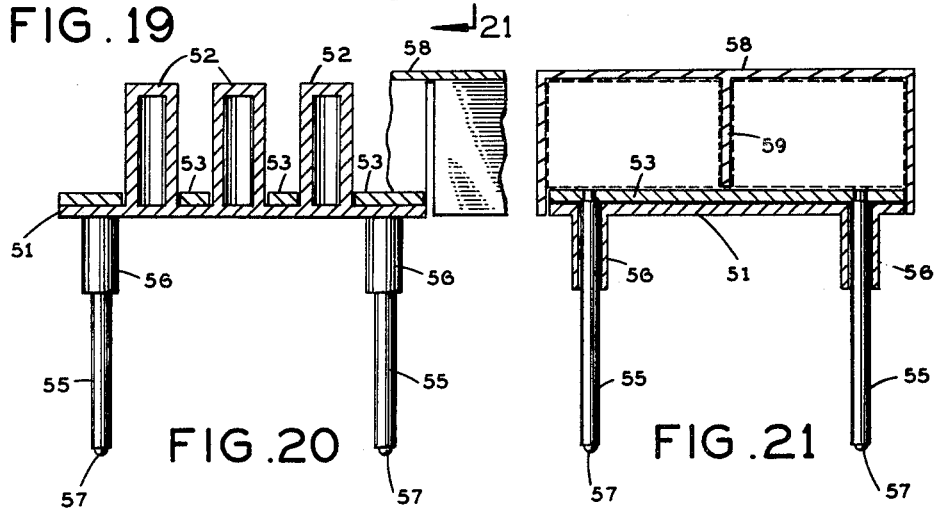
Figure 22:
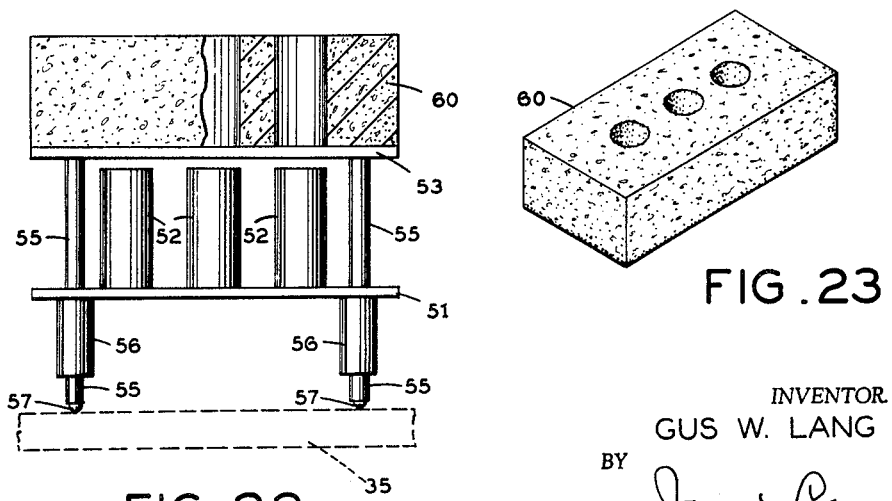
Figure 23:
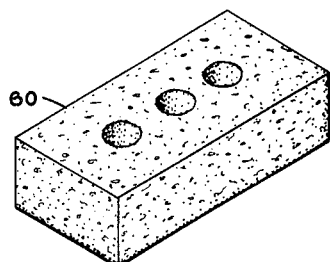
Figure 28:
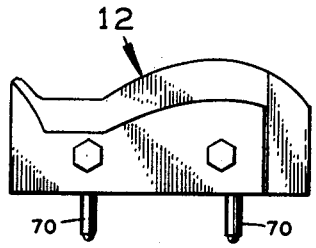
Figure 29:
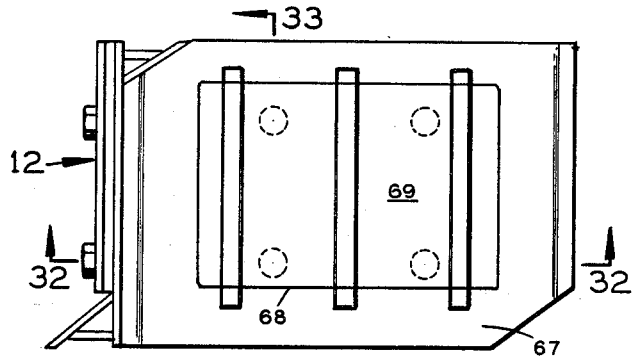
Figure 30:
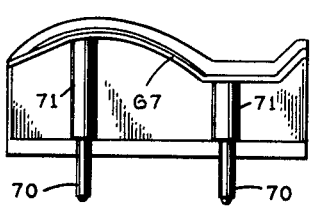
Figure 31:
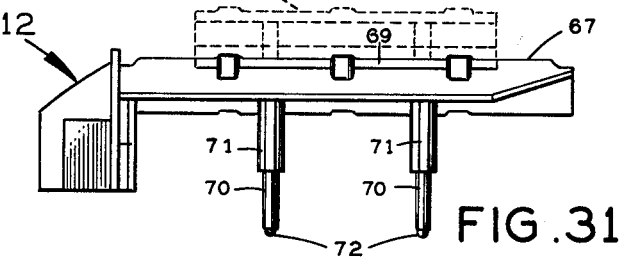
Figure 32:
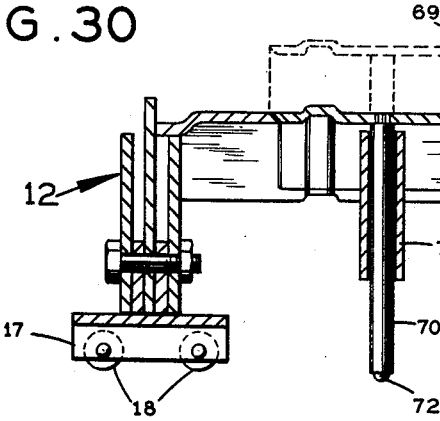
Figure 33:
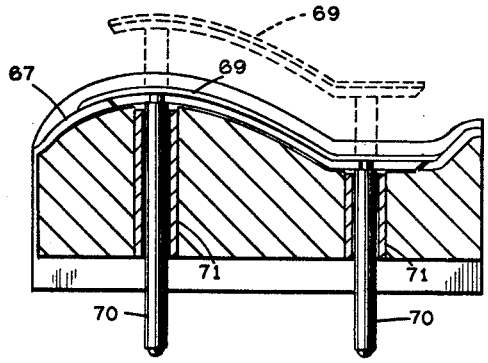
Figure 39:
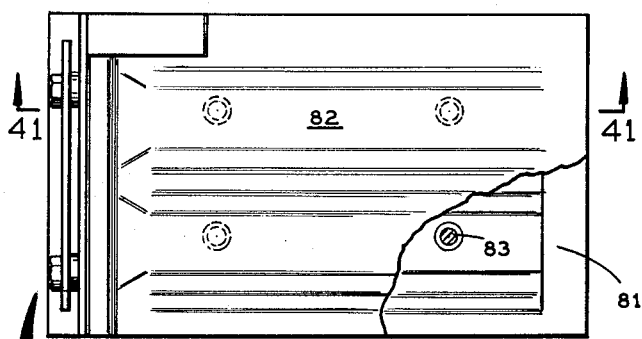
Figure 40:
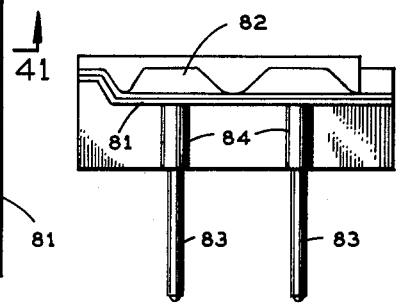
Figure 41:
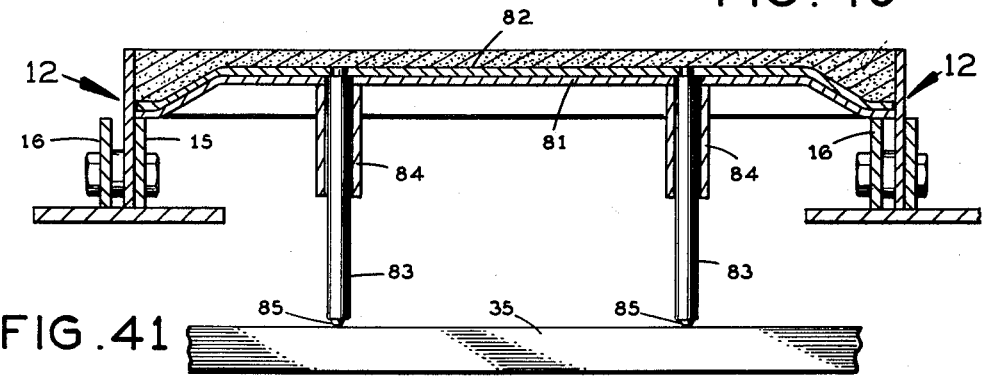
Figure 42:
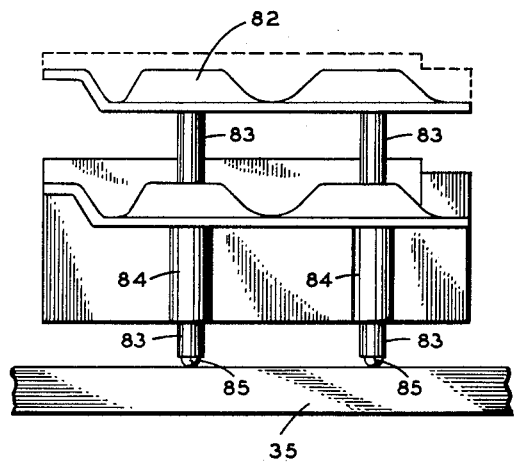
Figure 43:
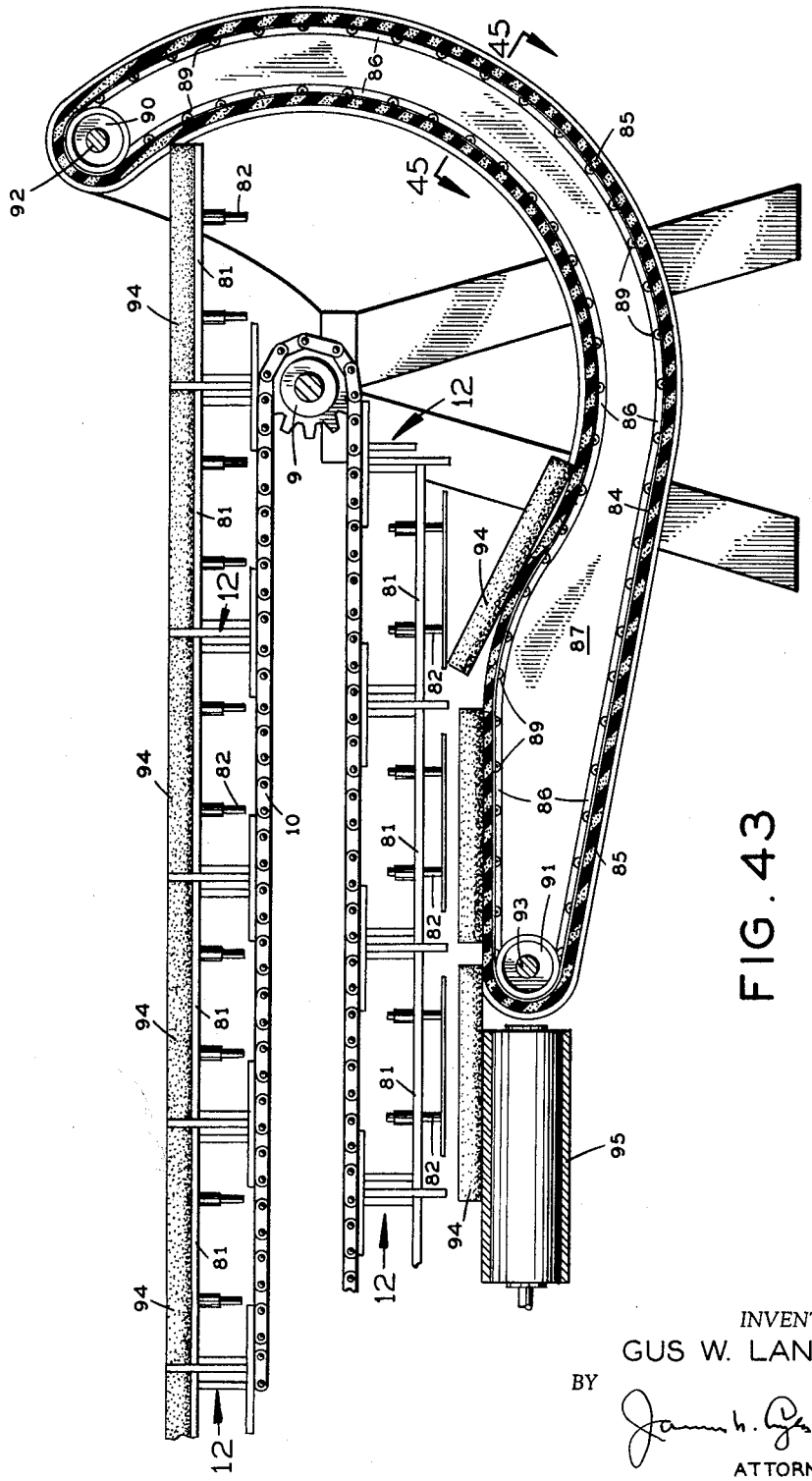
Figure 44:
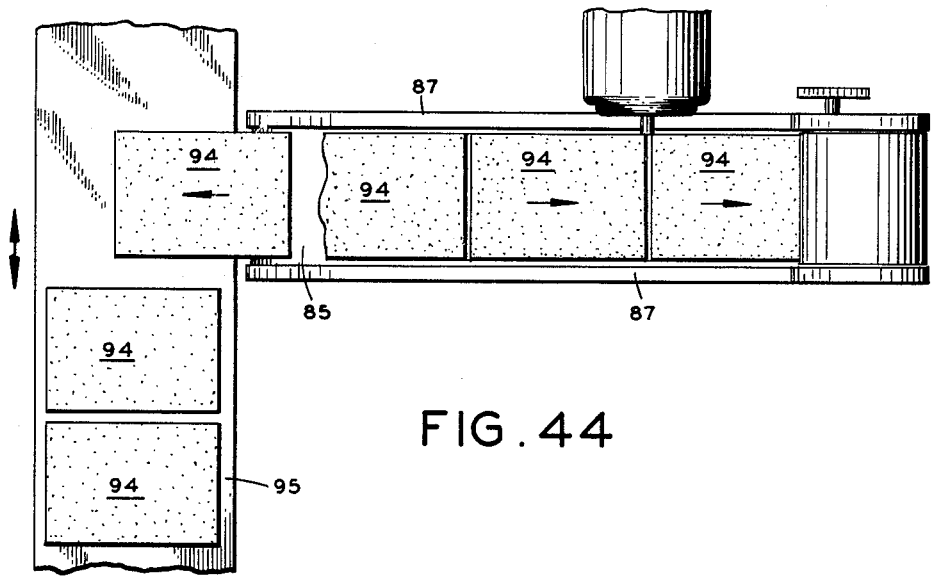
Figure 45:
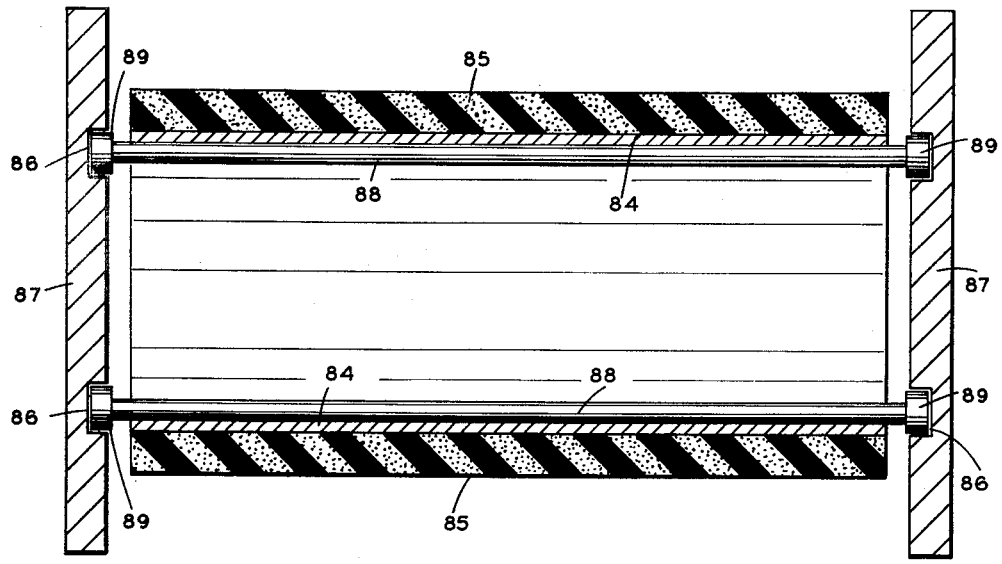
Figure 46:
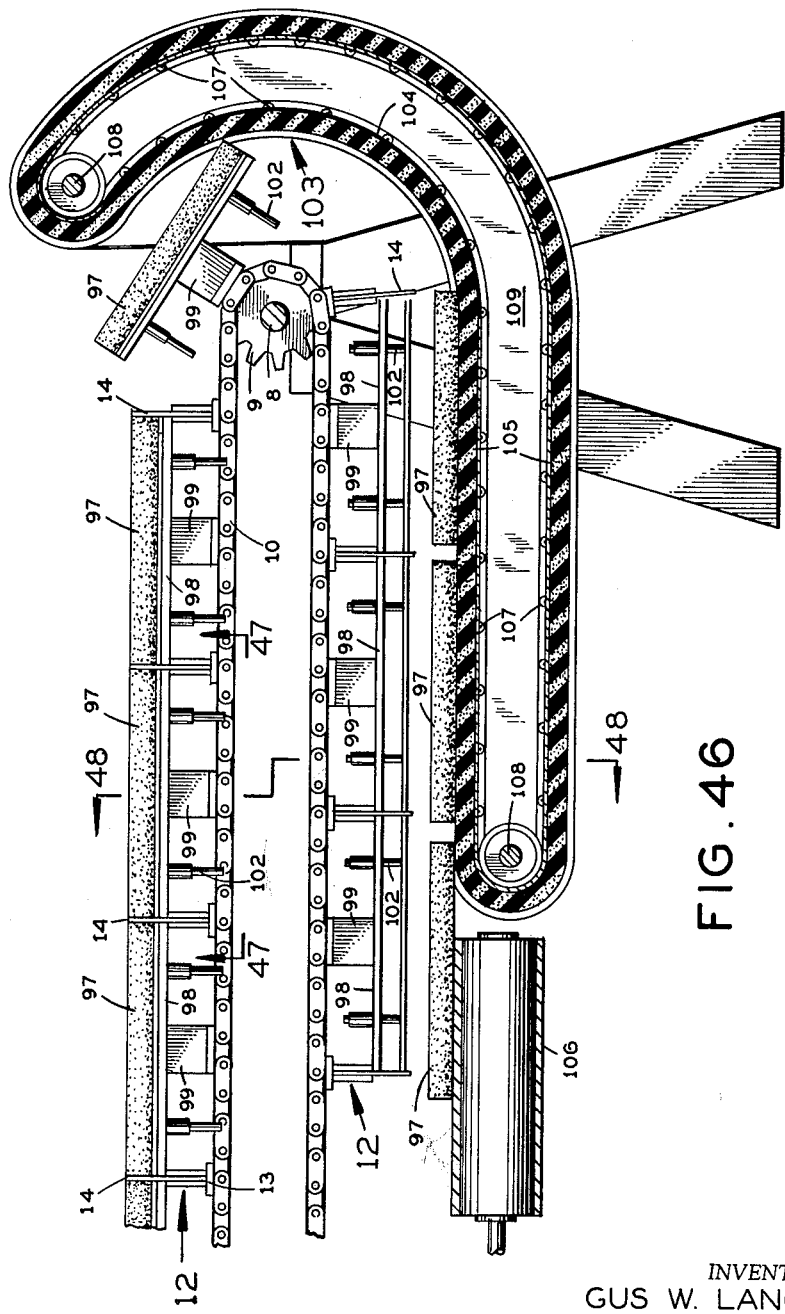

In the drawings:
FIGURE 1 is a side elevation of a machine constructed in accordance with the invention,
FIGURE 2 is a fragmentary top plan view thereof,
FIGURE 3 is a longitudinal section taken substantially on line 3—3 of FIGURE 2,
FIGURE 4 is a transverse section taken substantially on line 4—4 of FIGURE 2,
FIGURE 5 is an enlarged longitudinal section taken substantially on line 5—5 of FIGURE 2,
FIGURE 6 is a longitudinal section through a plurality of pallets, their supporting means and elevating means for raising the finished tile from the pallets.
FIGURE 7 is a transverse section taken substantially on line 7—7 of FIGURE 6,
FIGURE 8 is a side elevation of a pallet carrier,
FIGURE 9 is a plan view of a modified form of pallet and associated carrier,
FIGURE 10 is a side elevation of a pallet carrier having a modified form a pallet and elevating means for the tile formed on the pallet,
FIGURE 11 is a modified form of pallet and elevating means therefor.
FIGURE 12 is a longitudinal section of the structure illustrated in FIGURE 11,
FIGURE 13 is a plan view of a further modified form of pallet for molding building blocks of mastic material,
FIGURE 14 is an end view of the structure illustrated in FIGURE 13,
FIGURE 15 is a side elevation of the structure illustrated in FIGURE 13,
FIGURE 16 is a longitudinal section taken substantially on line 16—16 of FIGURE 13,
FIGURE 17 is a section taken substantially on line 17—17 of FIGURE 13,
FIGURE 18 is a perspective view of a building block formed by the structure illustrated in FIGURES 13–17,
FIGURE 19 is a modified form of the invention whereby to mold, cut and elevate a plurality of bricks formed of mastic material, FIGURE 20 is a fragmentary vertical section taken substantially on line 20—20 of FIGURE 19, FIGURE 21 is a transverse section taken substantially on line 21—21 of FIGURE 19, FIGURE 22 is a side elevation of a brick forming pallet and with the pallet being elevated, FIGURE 23 is a perspective view of a brick formed by the structure of FIGURES 19–22, FIGURE 24 is a plan view of a modified form of pallet and forming the conventional barrel-type tile, FIGURE 25 is a side elevation thereof, FIGURE 26 is a longitudinal section taken substantially on line 26—26 of FIGURE 24, FIGURE 27 is a section taken substantially on line 27—27 of FIGURE 24, FIGURE 28 is an end elevation of a carrier for a pallet adapted to form the conventional Spanish S tile, FIGURE 29 is a plan view thereof, FIGURE 30 is an end view of the pallet, the supporting plate and the elevating mechanism showing a tile molded thereon, FIGURE 31 is a side elevation of the device illustrated in FIGURE 29, FIGURE 32 is a longitudinal section taken substantially on line 32—32 of FIGURE 29, FIGURE 33 is a transverse section taken on line 33—33 of FIGURE 29, FIGURE 34 is a plan view of a modified form of pallet and supporting means therefor adapted to form a conventional Hip tile in a V-type, FIGURE 35 is an end view thereof, FIGURE 36 is a side elevation of the structure illustrated in FIGURE 34, FIGURE 37 is a longitudinal section taken substantially on line 37—37 of FIGURE 34, FIGURE 38 is a transverse section taken substantially on line 38—38, FIGURE 39 is a plan view of a further modified form of pallet and its associated carrier for forming a conventional thick butt tile, FIGURE 40 is an end view thereof, FIGURE 41 is a longitudinal section taken substantially on line 41—41 of FIGURE 39, FIGURE 42 is a view similar to FIGURE 40 but illustrating the pallet in the raised position for removal of the molded tile, FIGURE 43 is a view partly in section and partly in elevation showing a tile forming machine wherein the pallets supporting the tile and the tile carriers traverse a receiving looped belt whereby the tile is subsequently unloaded upon the belt by pallet depressing means and the tile having a continuous movement to a take-off lateral belt, FIGURE 44 is a fragmentary top plan view of the device illustrated in FIGURE 43, FIGURE 45 is a transverse section taken substantially on line 45—45 of FIGURE 43, FIGURE 46 is a longitudinal sectional view illustrating a further modified form of the invention wherein the pallets are supported by a carrier intermediate their length and with the carriers moving the pallet away from the division plates to cause the tile to engage to a continuous cushion belt for bottom unloading and with the tiles being subsequently shifted to a lateral take-off belt, FIGURE 47 is a bottom plan view of a pallet, a conveyor chain for a pallet carrier, FIGURE 48 is a transverse section taken substantially on line 48—48 of FIGURE 46, and FIGURE 49 is a fragmentary section taken substantially on line 49—49 of FIGURE 5 and illustrating an anti-friction carriage for the several pallet heads.

Referring now particularly to FIGURES 1–7 inclusive, there has been provided a machine having a main frame 5, supported at any desirable elevation by legs 6. The frame 5 at its opposite ends is provided with journal bearings 7, rotatably supporting shafts 8 and with the shafts 8 intermediate their lengths being provided with fixed sprocket gears 9. Engaging the sprockets 9, is an endless conveyor chain 10. The chain may be driven in any suitable manner by an electric motor or other power means that is connected to one shaft 8. The frame 5 supports a pair of spaced apart track elements 11 and these track elements may be of channel form or any other configuration.

Adapted to ride upon the tracks 11 are a plurality of equidistantly spaced apart pallet heads 12. Each pallet head is substantially identical in construction and includes a base plate 13, an upstanding plate 14 and side plates 15 and 16. The plate 14 is welded or otherwise rigidly connected to the base plate 13, while the plates 15 and 16 may be bolted to the opposite faces of the plate 14 and with the plates 16 being slightly spaced from the plate 14. The plate 13 is anti-frictionally slidably engaged with the tracks 11 by channel members 17, welded to the opposite ends of the plate 13 and the channel 17 supports grooved rollers 18 that engage the tracks 11. The rollers 18 and the mounting thereof are such that the rollers may be replaced from time to time as becomes necessary due to wear. The plates 14 have their upper marginal edges shaped in accordance with the particular transverse contour of the articles to be molded and will vary in accordance, as will be presently described in accordance with the shapes of roofing tiles or other articles to be molded by the machine. Since the heads 12 travel with the conveyor chain 10, it has been found desirable that the return or underflight of the chain and the heads should be adequately supported against sagging, due primarily to the excessive length of the machine and for this purpose, there has been provided an endless belt conveyor 19, engaging drums 20, that are rotatably supported in brackets 21 carried by the main frame 5.

Since all of the various modifications embodied in this application are formed on a substantially identical machine, there has been provided a hopper 21 that continously receives a predetermined quantity of mastic material from a chute 22. The pallets, to be described, with the chain conveyor and the heads 12 pass through the hopper 21 where they are loaded with the material that is to form the molded products. In certain instances, it may be found desirable to coat the articles after they leave the hopper and for this purpose there has been provided a coating apparatus 23, commonly referred to as a slicker and whereby to coat the article as it passes therethrough. The hopper and the coating apparatus 23 are old in the art and form no essential part of this application. As the molded articles leave the coating apparatus 23, they are completely formed and then enter an elongated oven 24. The oven 24, while not illustrated, in detail, may be of any desirable construction and length according to the necessary time, regulated by the speed of the machine whereby the tile or other articles may be suitably initially cured. The oven 24 may be of the type that is heated by electric coils or gas and it is contemplated, that the oven 24 shall be of such length, that when the tile or other product leaves the oven it is cured to such an extent that it may be handled without danger of breakage or, the oven may be of such length as to completely cure the articles prior to their discharge and removal from the machine.

One form of pallet has been illustrated in FIGURES 1–5, such pallet being stamped or otherwise shaped from sheet metal of approximately ¼ inch thick, forming grooves 25, inclined end portions 26 and marginal edge portions 27 adapted to form a conventional roofing tile such as that illustrated at 28 in FIGURE 4. The trailing end portion of the pallet is welded or otherwise connected to the upper marginal edge of the plate 15 and with the plate 14 constituting a divider between successive tiles and with the upper marginal portions of the plates 14 determining the thickness of the tile being formed. The opposite or leading end of the pallet has resting engagement upon the plate 16. The pallet is slotted at spaced apart points or the high points of the pallet for its major length as indicated at 29 and the marginal edges of the slots are beveled as indicated at 30. Closely fitting within the slots 29 are plates 31 and the marginal edges of the plates 31 are correspondingly beveled so that the plates will engage the slots to be flush with the raised areas of the pallet.

Means are provided to progressively elevate the plates 31 after the pallets have left the oven and to also elevate the molded and cured tile 28 above the pallet so that the tile or the like is then supported upon the plates 31 for manual or other convenient removal. For this purpose there has been provided a pair of push rods 32 for each plate 31. The rods 32 are fixed at the upper rods to the plate 31 and have vertical traverse engagement with suitable bearings 33. The rods 32 at their lower ends are preferably provided with anti-friction balls 34 that progressively engage inclined tracks 35. As the molded and cured tile leaves the oven 24, the rods 32 engage the tracks 35 having a relatively long gradually inclined surface and whereby the completed tile is gradually elevated above the pallets so that, at the discharge end of the machine, the finished pallets are elevated and may be easily removed from the supporting plates 31. As the pallet heads and the main body of the pallets continue to travel around the arcuate path of the forward sprocket 9, the leading end of the pallets will move away from the plates 16 of the next adjacent head 12 and continue in a reverse direction toward the entrance end of the machine and, as the heads and the connected pallets travel around the arc of the rear sprocket 9, the pallets automatically swing downwardly to again engage the resting plate 16 where they then enter the entrance end of the hopper 21 thus forming a continuous operation. The bearings 33 may may be carried by a cross plate 36 also slidably engaged with the tracks 11. As the pallets reenter the entrance end of the machine, the plates 41 will drop downwardly to again fill the slots 29.

In FIGURES 9–12, there has been illustrated a further modified form of pallet, indicated at 37. This pallet is adapted to form the conventional butt tile and is slotted as indictaed at 38 to receive elevating plates 39. The plates 39 in this case are connected together by transverse butt forming flange 40. The plates 39 are also provided with the elevating rods 41 having the anti-friction balls 32 at their lower ends for engagement with the tracks 35. The pallet 37 is also fixedly connected to the leading side of the pallet heads 12 as described in the first form of the invention and of course the slots 38 have their marginal edges beveled to have mating engagement with beveled edges formed around the slots. The operation of this particular form of pallet is substantially identical to that previously described but has only been altered with respect to the particular shape of the pallet and the tile to be formed thereon.

In the modification illustrated in FIGURES 13–17, there has been provided a pallet or form for the continuous manufacture of building blocks of conventional shape. In this form of the invention there has been provided a base plate 42 carrying upstanding tapered core members 43 and an end divider plate 44. This form of pallet constitutes the means for molding cement or clay building blocks having a dimension of approximately 8 inches x 8 inches x sixteen inches. The pallet travels between side plates 45, shown in dotted lines whereby the mastic material may be fed into the form created thereby to be forced downwardly between the core members 43 to the tops thereof. The means for elevating the blocks after they have passed from the curing oven, comprising a plate 46, having cross members 47 that engage between the base portions of the taper cores 43. The plate 46 adjacent to a pair of cross members 47 is connected to elevating rods 48, traversing bearings 49, carried by the pallet plate 42. The rods 48 also are provided with the elevating tracks 35 and whereby the blocks, after they leave the oven are progressively elevated above the form where they may be conveniently removed from a discharge end of the machine.

With respect to FIGURES 19–23, there has been illustrated a brick molding apparatus that includes a pallet having a base plate 51 that carries a plurality of upstanding hollow cylindrical plugs 52. The pallet is of such width as to form a pair of bricks simultaneously having cylindrical openings therein, as shown in FIGURE 43, the bricks being of conventional dimensions. Overlying the plate 51 and substantially conforming thereto is an elevating plate 53 that is cylindrically apertured at 54 to freely engage over the plugs 52. The plate 53 adjacent each of its sides is provided with elevating rods 55 corresponding to the rods in the other forms of the invention. The rods 55 operate through bearings 56 carried by the plate 51. These rods are also provided with the anti-friction balls 57 for slidable engagement with the tracks 35. The mastic material forming the bricks enters the form created by the plugs 52, pallet heads and side flange plates not illustrated and then enters, under the influence of the chain 10 to a fixed housing 58 that has dimensioned in accordance with the width and thickness of the bricks, to be formed. The housing 58 and the divider plate of the pallet heads are vertically slotted to engage a slicing partition 59, carried by the housing intermediate its width and whereby to slice the molded section into a pair of substantially identical bricks after which, the bricks continue through the oven 24 to be subsequently elevated by the rods 5 for removal from the discharge end of the machine, such being in accordance with the various pallets and their elevating means as previously described. It may be found desirable to install within the housing 58 scoring means whereby the bricks passing therethrough will have their edges scored or serrated. The bricks, illustrated at 60 are thus progressively formed, two or more at a time, depending upon the width of the machine and subsequently elevated after passing through the oven for ready removal from the elevating plate 53. It will thus be apparent that the bricks may be molded in multiple as a single mastic such as cement or clay, then sliced longitudinally before entering the oven where they are cured to a desirable degree prior to elevating the bricks by the rods 55. With this construction and type of molding, the production of conventional bricks having holes formed therethrough is continuous and economical to form.

In FIGURES 24–26 there has been illustrated a modified form of pallet for molding the conventional barrel tile. Here, the pallet has been illustrated at 61 and the pallet has been cut away from its apex to opposite sides as at 62. The opening formed by the cut away is normally closed by an arcuate plate 63, conforming in curvature to the pallet 61 and the plate 63 extends for the major area of the pallet. This pallet is carried by the usual pallet heads 12, having a divider plate 14, a side plate 15 that has its marginal edge shaped in accordance with the curvature of the pallet and an outer plate 16, the upper marginal edge of which is conformed to the curvature of the pallet and upon which the free edge of the pallet has resting engagement. While this pallet has been illustrated in FIGURE 24 as being tapered in length, it follows that the pallet may be modified to have its marginal edges straight and parallel. The plate 63 is likewise connected to the push rods 64, having bearing guides 65 and with the rods having the usual anti-friction balls 66 at their lower ends for engagement with the tracks 35. The barrel tile shown in FIGURE 27 at 67 is formed in the usual manner with a thickened central portion and progressively tapering edge portions. The forming of such tiles is well known in the art and suitable mechanism, such as rollers may be employed to determine the actual thickness of the tile to be formed. The operation of this form of pallet is substantially identical to that previously described since basically, the invention resides in means for elevating the tile after curing so that the pallets become a fixed part of the machine and travel under the influence of the chain 10 creating a continuously operating machine without the necessity of removing the pallets after the tile has been formed thereon such, being common practice in machines heretofore patented.

Referring now to FIGURES 27–33, there has been provided a pallet for forming the conventional Spanish S tile. In this form of the invention the usual pallet heads 12 are provided to support the pallet 67. The pallet 67 is provided with a generally rectangular opening 68 that is covered by a plate 69. The plate 69 is shaped until contoured in accordance with the contour of the pallet 67 and its edges are beveled to engage beveled edges formed upon the opening 68 whereby the plate prior to elevation will lie substantially flush with the surface of the pallet. The plate 68 is provided with the elevating rods 70, operating in guide bearings 71 that may be supported upon the bottom of the pallet outwardly of the opening 68. The rods 71 carry the usual anti-friction balls 72 for riding engagement with the tracks 35. In all other respects, the pallet functions substantially identical to the pallets previously described and are filled from the hopper with mastic material and conveyed through the oven 24 after which the rods 70 engage the tracks 35 to elevate the plate 69 to shift the molded tile upwardly away from the plates 67 where they may be conveniently removed from the discharge end of the machine.

In FIGURES 34–38, there has been illustrated a further modified form of pallet calculated to mold the conventional Hip tile. The pallet indicated at 73 is triangular in shape, having a ridge portion 74 and downwardly inclined side portions 75. The pallet 73 is cut away for its major length and an equal distance from either side of the ridge 74, to form an opening 76. The opening 76 is covered by a triangular plate 77 conforming in transverse shape to the shape of the pallet and the marginal edges of the plate 77 and the marginal edges of the opening 76 are beveled for snug engagement and whereby the plate 77 in its normal position will be flush with the surface of the pallet. This pallet is also supported by the heads 12 at one end and with the opposite end resting upon the plate 16. The plate 77 is provided with a plurality of push rods 78, slidable through bearings 79 and the rods 78 are provided with the usual anti-friction balls 80 at their lower ends. This pallet has been illustrated in FIGURE 34 as being tapering in length although it will be apparent that the pallet may be varied to mold rectangular tile having the straight parallel edges. The operation of this form of the invention is substantially identical to that previously described.

In FIGURES 39–42, there has been illustrated a modified form of pallet for molding roofing tile but here, a lower pallet 81 of predetermined shape supports a corresponding pallet 82, being in overlying relation to the pallet 81. The pallet 81 is connected as before at its trailing end to the plate 15, while the pallet 82 merely resets upon the pallet 81 to be bodily elevated by rods 83, operating in bearings 84 and with the rods having the balls 85 at their lower ends for traverse engagement with the elevating track 35. In this case, the overlying pallet 82 is the forming pallet and the elevating of the tile is accomplished by bodily elevating the pallet 82 by the rods 83. The operation of this form of the invention is substantially identical to the forms previously described and the carriers 12 having the pallets 81 welded or otherwise connected to the plates 15 at the trailing end of the pallet, the pallets will continuously move through the machine under the influence of the conveyor chain, passing into the oven where the tile is partially cured or substantially cured and then passing outwardly from the oven to a point where the rods engage the tracks 35 to progressively elevate pallets and the molded tile formed thereon for removal at the forward end of the machine.

Referring now to FIGURES 43–45, there has been illustrated a further modified form of the invention, where the tile being molded upon the pallets partakes of an arcuate movement at the discharge end of the machine and whereby the molded articles are deposited upon an arcuate belt or apron to be conveyed in a reverse direction for deposit upon a lateral take-off.

Here, the conveyor chain 10 traverses the sprocket 9 and the same pallet heads 12 are employed, carrying the pallets 81, constructed and supported by the heads 12 in the same manner as previously described. The pallets 81 are of course provided with the push rods 82 and the pallet heads traverse the trackways 11, as previously described. Each of the pallets 81, depending upon the particular configuration of article to be molded thereon are provided with the usual segments or filler plates 83 and in the first forms of the invention, the tile or other article was adapted to be raised from the pallet for subsequent removal either manually or upon a suitable conveyor mechanism. In this case, the belt, indicated at 84 has a relatively thick cushion facing 85, preferably of foam rubber and the belt is guided in grooves or trackways 86, formed in side plates 87 that are rigid with the frame of the machine and the belt 84 is provided with a plurality of cross rods 88, carrying rollers 89 that traverse the track grooves 86 thus, maintaining the belt at its forward portion in an arc struck from the shaft 8. The rods 88 extend between sprocket chains 89 carried by the belt 84 and engage sprockets 90 and 91, such sprockets being on shafts 92 and 93 that are positively driven at substantially the same rate of speed of the chain 10. As the molded tile or the like, indicated at 94 passes around the arc of the sprocket 9, the pallet 81 and its supported tile is progressively moved in the arc of the belt 84 under the influence of the heads 12, since the heads 12 are connected to the chain 10 and the trailing end of the pallets are connected to the heads. As the heads and the pallets with their supporting molded product moves in an arc downwardly, the tile 94 drops downwardly to engage the foam rubber facing 85. While the tile may drop downwardly due to its weight, it may be found necessary to employ lower rails, corresponding to the rails 35 to force the strips 83 downwardly by the rods 82. It is believed however that the weight of the tile will permit the disengagement thereof with the pallets by gravity. The tile is then continued rearwardly of the machine, as indicated particularly in FIGURE 43 so that the tiles are subsequently moved to a lateral conveyor 95 where the tiles are conveyed to any desirable point away from either side of the machine for subsequent removal by the operator. The tracks 35 have not been indicated in this form of the invention and the major portion of the device is substantially identical to that previously described.

Referring now to FIGURES 46–48, there has been illustrated a further modified form of the device corresponding generally to that illustrated in FIGURE 43.

Here, there is provided the same chain 10, sprocket 9 and shaft 8. In this form of the invention, pallet heads 12 are employed, as before, having the base plate 13 that is anti-frictionally slidable upon the tracks 11 and with the plates 14 of the pallet heads 12 having the upper marginal edge shaped in accordance with the article to be molded on pallets 96, such articles being indicated as a tile of any configuration indicated at 97. In this particular form of the invention, the plates 14 are merely separator plates between the tile 97 and the pallets 96 have no fixed connection to the heads 12. Each of the pallets 96 are supported upon a base plate 98. The base plate 98 is provided intermediate its length with a bracket 99 that is connected to the chain 10 by pins 100. The pallets 96 are also provided with the ejecting plates 101, shiftable upwardly under the influence of the push rods 102 that traverse the progressively inclined tracks 35, not shown. As the cured or partially cured tile leaves the oven, they are progressively moved upwardly by the rods 102 and by the upward shifting of the molded tile, the tile has a sliding engagement with respect to the plates 14 of the heads 12 whereby the ends of the tile when elevated have a smooth finished end. As the tile and its elevated pallet is moved around the arc of the sprocket 9, the tile will be engaged with an arcuate or concentric portion 103 of an endless conveyor belt 104. The belt 104 is provided with a cushion facing 105, of foam rubber or the like and the belt is provided with the cross rods 106, carrying the rollers 107 that engage within the track grooves 108 of side plates 109 so that the tile is progressively engaged with the cushion face of the belt in a progressive even manner that will prevent the tile from falling abruptly on to the belt and, at the lower end of the arc of the belt, the tile will be deposited upon the foam rubber face 105 to be subsequently deposited upon a lateral conveyor belt 106 that may be extended to either side of the machine and of any length whereby the finished product may be removed for stacking or loading into a truck or other conveyance. The belt 104 upon its inner side is provided with a linked chain conveyor 107, that engages sprockets 108 at its opposoite ends. The belt 104 is endless and the lower flights thereof are substantially parallel to the flights of the chain 10. In this particular form of the invention, the pallets 98 are not fixed to either adjacent head 12, but merely rest thereon. The return flight of the chain 10, together with the plate 98 and the heads 12 may be guided by rollers 110 upon longitudinal tracks 111, that are fixed with respect to the supporting structure of the machine and whereby the heads and the pallets are supported in a generally straight line against sagging since the machine is relatively long and the weight of the pallets and the heads must be supported in the return flights so as to carry the pallets and their supporting heads in a line substantially parallel with the straight line flight of the belt 103.

It will be apparent from the foregoing that novel means have been provided for the continuous and uninterrupted manufacture or molding of mastic articles. The relatively long machine permits the continuous and uninterrupted manufacture of tile or similar articles, from a point where the pallets are filled by the hopper, compressing the material into the pallet and then shifting the tiles continuously through a baking oven where they are effectively cured or hardened to a degree where the tile can be lifted from the machine, requiring only a predetermined number of pallets in accordance with the length of the conveyor chain. Machines of this character heretofore have required pallet carriers and with the pallets being manually placed upon the machine for filling and at the discharge end of the machine, the pallets have been manually removed with the molded products, requiring a very substantial cost for pallets since, the pallets and the supporting molded articles were removed and placed in a rack where the tile or the like must cure. With this machine, the cost of additional pallets has been avoided since, in the present invention, the pallets are provided with elevating means that elevate the tile or the like above the pallets after they have been cured in the oven, permitting the pallets to remain upon the machine and after passing through the oven, the molded products are of such density and hardness that they can be manually removed. This is not true in any of the prior art machines for molding tile or the like. The machine is continuous in operation and in the first forms of the invention only require a single operator to remove the finished tiles. The structure as presented results in a very considerable saving in labor costs and the subsequent over-all costs for the manufacture of the tiles.

It is to be understood that the invention is not limited to the precise construction shown, but that changes are contemplated as readily fall within the spirit of the invention as shall be determined by the scope of the subjoined claims.

Having described my invention, what I claim as new and desire to secure by Letters Patent is:

1. A machine of the character described for molding mastic articles comprising a frame, an endless chain conveyor extending through the frame and with the chain engaging sprocket wheels at the opposite end of the frame, the chain being supported against sagging throughout its length both forward and reverse, a plurality of brick forming pallets supported upon and driven by the chain, a hopper carried by the frame and overlying the pallets whereby the pallets are filled with a mastic material as they pass therethrough, each of the pallets being separated at their ends, each of the pallets embodying a flat plate having a group of free core forming members adjacent each side and whereby to form a pair of bricks simultaneously, a plate overlying the pallet and with the plate being substantially the same dimension as the pallet, the plate being provided with a plurality of openings for engagement over the core forming members, the second named plate being provided with push rods and extend downwardly below the pallet for tranverse engagement with a progressively inclined trackway, a housing disposed over the pallets and fixed with respect to the frame and through which the filled pallets travel, the housing having a division wall intermediate its width that constitutes a slicer for slicing the pair of bricks into separate units, a curing oven through which the bricks travel after leaving the housing and with the rods elevating the second named plate after the bricks have passed beyond the oven and whereby the bricks are vertically removed from the cores, the said partition of the housing terminating downwardly to a point that permits the pallet and its overlying plate to freely pass therebeneath during the slicing operation.

2. A machine for casting roofing tile or the like that comprises a main frame, an endless chan conveyor extending through the frame, sprocket wheels at each end of the frame and with at least one of the sprockets being driven, a plurality of equidistantly spaced pallet heads that are fixed to and travel with the chain conveyor, the pallet heads being supported upon trackways carried by the frame, pallets extending between each of the pallet heads and with the pallet heads constituting a division between each molded pallet, each of the pallets intermediate their length being fixed to the chain conveyor and whereby the pallets may disengage the heads as the chain conveyor traverses the sprocket, a hopper at the rear end of the machine for filling the pallets with the mastic material, a heated curing oven to which the filled pallets pass, means carried by each pallet that is shitftable away from the pallet for a discharge of the title, an endless apron at the discharge end of the machine having a portion thereof formed on the arc of movement of the pallets around the forward end, the apron being guided in its arcuate movement by fixed side plates and with the apron extending rearwardly beneath the machine, the opposite ends of the apron being engaged with sprocket wheels and with at least one of the sprocket wheels being driven whereby the apron is continuously driven at a speed of the conveyor chain, the cured tile as supported upon the pallets adapted to be deposited upon the apron as the pallets are conducted toward the entrance end of the machine by the conveyor chain, the said shiftable means of each pallet dropping downwardly for releasing the cured tile upon the apron and a lateral take-off conveyor adjacent to the discharge end of the apron whereby the tile are progressively shifted from the apron to the conveyor for lateral movement and take-off.

3. The structure according to claim 1 wherein the pallets have their ends in resting support upon the pallet heads and with the pallet heads and the pallets being movable with respect to each other to permit the loaded pallet to move around the arc of the forward sprocket and with the pallets again engaging the pallet heads during the movement of the chain conveyor on its return flight, the apron including a belt that is supported by a plurality of closely arranged cross rods, the cross rods at their opposite ends being provided with rollers and with the rollers adapted to traverse grooves formed in the side plates and whereby the apron is guided throughout its arcuate portion for its lower flight, the surface of the apron being covered by a relatively thick sponge rubber facing and whereby the tile, as discharged from the pallets engage upon the apron without danger of breakage.

4. A machine for continuously forming mastic articles such as roofing tile that comprises a supporting frame, sprocket wheels rotatable at each end of the frame, an endless chain conveyor that engages the sprocket wheels and means for driving at least one of the sprockets, a plurality of equidistantly spaced apart pallet heads fixed to the chain and with the pallet heads at each end engaging trackways carried by the frame, pallets supported between the several pallet heads and with the pallets being fixed at their trailing ends to the adjacent heads and having a resting engagement upon the next adjacent leading head, means carried by each pallet that is shiftable to move the molded tile away from the pallet heads, an arcuate apron that is concentric to the axis of the forward sprocket wheel and whereby the molded tile may be discharged from the pallets as the pallet heads move around the forward sprocket, the pallets and the supported tile as it passes around the forward sprocket discharging the tile upon the apron, the said apron being guided in its arcuate path and extended rearwardly of the machine and beneath the lower flight of the chain for a lateral take-off conveyor that may project beyond either side of the machine for conveying the tile to a point of discharge, the apron being supported in side plates carried by the machine and with the apron being supported by closely adjacent cross rods that have anti-frictional guiding engagement in slots formed in the side plates, the apron and the cross rods engaging sprockets that are journaled in the side plates and with at least one of the sprockets being driven, the apron being driven at substantially an identical speed to the conveyor chain.

5. A machine for continuously molding mastic articles comprising a main supporting frame, sprocket wheels journaled at the opposite ends of the frame, an endless conveyor chain traversing the sprocket wheels and with one sprocket wheel being driven, a plurality of equidistantly spaced pallet supporting heads that are connected to the chain, mastic forming pallets carried by the head and with one end of the pallet being fixed to one head and having resting engagement upon the next adjacent head, a hopper supported along side rails of the frame and overlying the pallets and whereby to progressively fill the pallets with a mastic material as the pallets pass therethrough, trackways for supporting the heads so that the chain and the pallets travel in a horizontal path, a heated curing oven disposed over the line of movement of the pallets and through which the filled pallets pass to cure the mastic material, elevating means associated with each pallet and whereby the cured mastic article is progressively elevated above the face of the pallet, each of the elevating means being provided with elevating rods that engage a progressively inclined trackway after the pallets leave the oven and guide means for supporting the heads and pallets for a return movement to a leading end of the conveyor, each of the heads comprising a baseplate, a central upstanding plate fixed to the heads and that is contoured at its upper edge to conform to the particular contour of the article to be molded, the upstanding plates also constituting a separator between the articles being molded, the ends of the baseplate having anti-frictional guiding engagement upon the trackways of the frame, a pair of plates connected to the upstanding plates upon opposite sides, the pallet having its trailing end fixedly connected to one sideplate, the opposite end of the pallet resting upon the opposite sideplate of the next leading head, the sideplates also being contoured upon their upper edges to conform to the transverse curvature of the pallet, each of the pallets being longitudinally slotted at spaced apart points and with filler strips engaging into the slots, the marginal edges of the filler strips and the slots being beveled whereby the strips in normal molding position are flush with the face of the pallet and conforming transversely to the shape of the pallet, each of the strips carrying rods that extend downwardly for engagement with the progressively inclined trackways and with the rods being slideable, and bearings carried by the main body of the pallet, and anti-friction balls disposed below the lower end of the rods and whereby anti-frictionally engage the inclined trackways for progressively elevating the rods and strips to elevate the molded article from the pallet.

6. A machine for continuously forming mastic articles, such as roofing tile, that comprises a supporting frame, sprocket wheels rotatable at each end of the frame, an endless chain conveyor that engages the sprocket wheels and means for driving at least one of the sprockets, a plurality of equidistantly spaced apart pallet heads fixed to the chain and with the pallet heads at each end engaging trackways carried by the frame, pallets supported between the several pallet heads and with the pallets being fixed at their trailing ends to the adjacent heads, and having a resting engagement upon the next adjacent leading head, means carried by each pallet that is shiftable to move the molded tile away from the pallet heads, an arcuate apron that is concentric to the axis of the forward sprocket wheel and whereby the molded tile may be discharged from the pallets as the pallet heads move around the forward sprocket, the pallets and the supporting tile as it passes around the forward sprocket, discharging the tile upon the apron, the said apron being guided in its arcuate path and extended rearwardly of the machine and beneath the lower flight of the chain for a lateral takeoff conveyor that may project beyond either side of the machine for conveying the tile to a point of discharge, said apron being provided with a relatively thick foam rubber covering whereby the tiles may be discharged thereon without breakage, the machine including a hopper for filling the pallets with fluent mastic material and a heated curing oven through which the filled pallets travel and means to support the conveyor chain, the heads and the pallets during the reverse flight of the conveyor chain, the lateral conveyor being closely adjacent to the discharge end of the conveyor and whereby the tiles are progressively discharged onto the conveyor.

References Cited by the Examiner

UNITED STATES PATENTS

| | | | |
|---|---|---|---|
| 57,791 | 9/66 | Stafford | 25—99 |
| 1,001,952 | 8/11 | Henley | 25—99 |
| 1,453,746 | 5/23 | Carey | 25—99 |
| 1,453,747 | 5/23 | Stafford | 25—99 |
| 1,534,361 | 4/25 | Craig | 25—99 |
| 1,608,768 | 11/26 | Buttress | 25—120 |
| 1,814,172 | 7/31 | Martinet | 25—99 |
| 2,912,738 | 11/59 | Bergling et al. | 25—2 |
| 2,965,949 | 12/60 | Lang | 25—43 |
| 3,055,073 | 9/62 | Gerwick | 25—2 |

FOREIGN PATENTS 107,806  7/39  Australia.

WILLIAM J. STEPHENSON, *Primary Examiner.*
ROBERT F. WHITE, *Examiner.*